Sept. 17, 1968  L. E. FOLK  3,401,861
APPARATUS FOR JOINING METALS
Filed Oct. 22, 1965
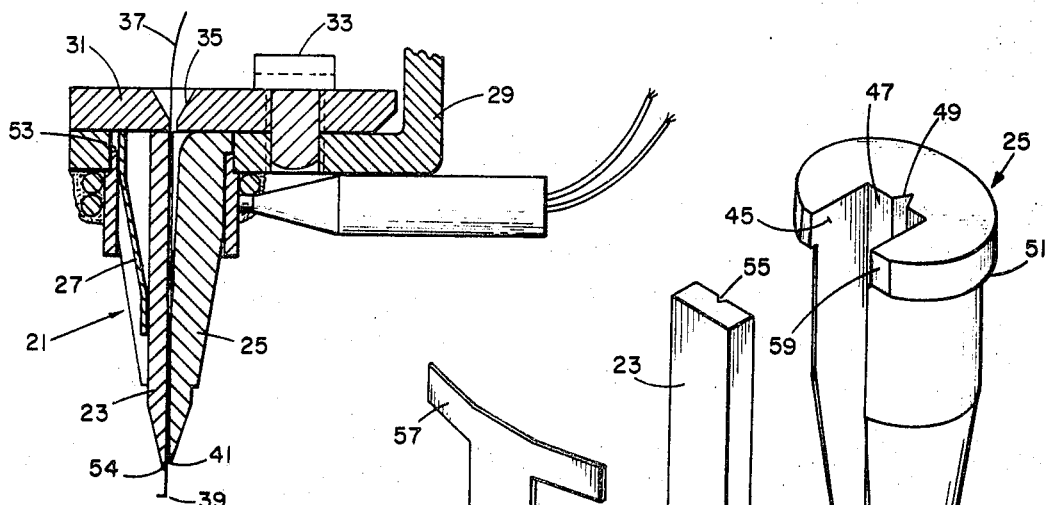
Fig.1
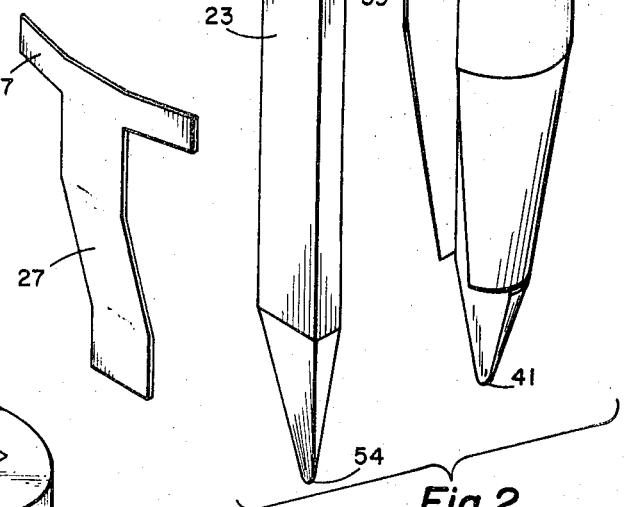
Fig.2
Fig.3
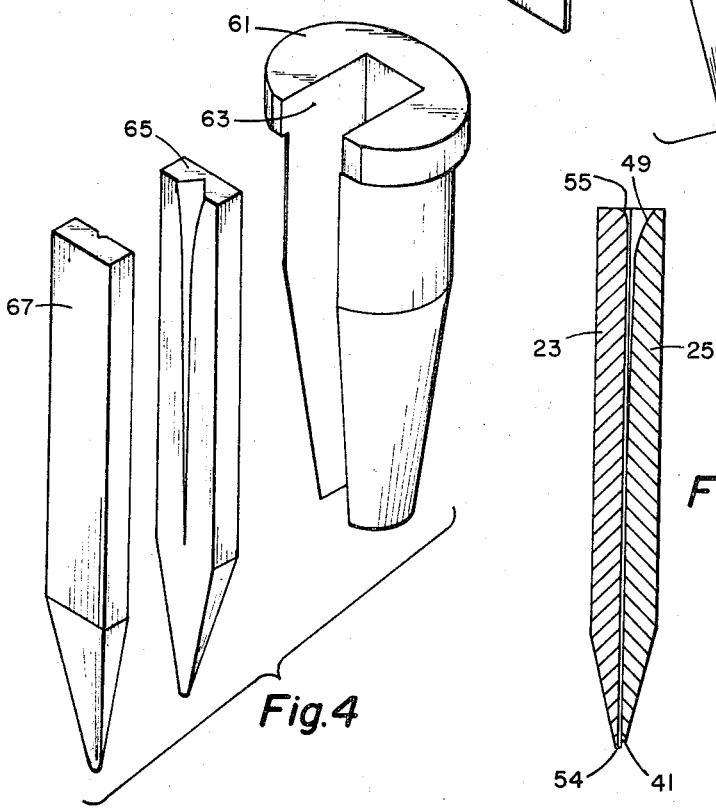
Fig.4

United States Patent Office
3,401,861
Patented Sept. 17, 1968

3,401,861
APPARATUS FOR JOINING METALS
Lee E. Folk, Phoenix, Ariz., assignor to Motorola, Inc., Franklin Park, Ill., a corporation of Illinois
Filed Oct. 22, 1965, Ser. No. 501,606
6 Claims. (Cl. 228—1)

ABSTRACT OF THE DISCLOSURE

A holding member has a tapered groove facing a replaceable pressure member having an elongated smooth groove facing the tapered groove and releasably held against the holding member. The pressure member extends downwardly beyond the holding member for engaging a wire to perform a bonding operation. A back plate prevents longitudinal movement of the two members and has a funnel-shaped aperture for receiving and guiding a wire between the facing grooves which have an opening much greater than the diameter of the wire such that it may be easily threaded toward the tip of the pressure member.

---

This invention relates to an assembly for the joining of ductile materials. More particularly, it relates to the portion of a joining assembly which contacts and applies pressure to ductile materials.

Thermocompression welding has become a widely used method of joining ductile materials, particularly metals and metallic alloys. These ductile materials, which will hereafter be referred to in the wire form, are pressed together by a shaped tool while pressure and heat are applied to form a strong bond between the materials. As a result, the use and technology of thermocompression welding has greatly expanded during the rapid growth of the semiconductor industry. This method of welding has been found to be advantageous for forming strong connections between the fine wires and the small bonding areas used in semiconductor devices.

More recently, ultrasonic welding has been studied as a method of making connections in semiconductor devices. Many features of the equipment used in this technique are very similar to that used in thermocompression welding. As the name implies, this method relies on ultrasonic vibrations along with pressure and sometimes heat to join the wires. Ultrasonic bonding appears to have certain advantageous features that indicate it may displace thermocompression welding in some applications.

The assembling of semiconductor devices normally requires the bonding of wires about 1 to 5 mils in diameter to a semiconductor die having minute bonding areas. In order to economically produce semiconductor devices it has been necessary to develop joining techniques wherein the wire used comes from a supply capable of making thousands of connections. This eliminates the necessity of handling a large number of very small wires.

Tungsten carbide capillary tubes or needles are widely used as a means of both feeding the ductile material and applying pressure and heat thereto. To form this capillary tube it is necessary to drill a minute hole to very close tolerances through this tungsten carbide material. In the addition to the drilling of this fine hole, the contour of the tip of the capillary must meet rigid dimensional requirements. The microdimensions required for a tip to weld .001 inch diameter wire are: .0005, ±.0001 inside radius; .001, ±.0001 inch flat; .0005, ±.0001 inch outside radius; and .0015, ±.0001 inch inside diameter of the needle. The determination of the contour of the tip is difficult because a profile of the machined surface is not available for measuring as a result of the circular shape of this tip. The resulting capillaries are costly to produce and lack the desired dimensional accuracy.

To obtain good assembly line production bonds there should be a smooth blending of the tangent points of the tip with the adjacent surfaces of the capillary. The quality of the bond is dependent on the exactness with which the capillary tip is formed. If the contour of a capillary is not correct, the bond formed will be weak and possibly the wire will be distorted to such an extent that a fracture will occur. To facilitate high volume production it is advantageous that the capillary used be interchangeable to prevent the adjusting of the bonding equipment every time a capillary is changed. If the capillaries are not interchangeable there will be a loss of production from faulty bonds and equipment down time for adjusting the bonding equipment.

The capillary structure advantageously provides an integral portion as a route for feeding the wire. With the capillary the wire is threaded through the tube and is thereby centered for easy control during the bonding. To thread the capillary, a trial and error type operation is utilized. The wire is poked through the large entry hole in an attempt to thread the small hole in the tip. This operation is difficult because the capillaries are normally constructed with a large bore that tapers sharply or has a step reduction to a very small bore. The step reduction often results in damage to the wire during initial threading, thereby requiring repeated attempts to thread the capillary. This difficulty also results in lost production when the capillaries become dethreaded, because of the excessive time required to rethread. These capillaries are also subject to jamming by knots or kinks that often form in the very fine wire. The small bore makes access for removal of the jammed wire difficult. In attempting to remove the jam, serious damage is often done to the tip thereby necessitating changing of the capillary. The capillary is also structurally weak and is easily damaged by many other means such as, striking with a foreign object, applying too much pressure when bonding and misalignment.

A wedge shaped tool, stronger structurally than the capillary tube, has also been used to form bonds. Strength is gained, with the wedge, at the sacrifice of the center feed and the associated high production rate. Although many tip contours and reinforcing schemes have been tried, the basic capillary tube is still widely used because it offers many advantageous features.

An object of this invention is to provide a bonding tip assembly which will reduce the cost of forming thermocompression and ultrasonic bonds by reducing the cost of the pressure member and increasing the bonding efficiency.

Another object of this invention is to provide a bonding tip assembly having a member for applying pressure to the ductile material, which member is stronger structurally and not as easily damaged as the bonding tips being presently utilized.

A further object of this invention is to provide a bonding tip assembly having a holder for the pressure member which will facilitate the threading and feeding of the ductile material to the tip of the pressure member.

A still further object of this invention is to provide a bonding tip assembly which allows easy access for repair and cleaning of the region supplying a ductile material to the tip of the pressure member.

An additional object of this invention is to provide a bonding tip assembly for bonding ductile wires or ribbons, which assembly may be easily adjusted for use with wires or ribbons of different dimensions.

A feature of this invention is an easily changed bonding tip assembly having an inexpensive separable pressure member which may be replaced individually or as part of the entire unit.

Another feature of this invention is a bonding tip assembly having a pressure member of elemental shape that may be easily machined to exacting tolerances. This pressure member will advantageously have a groove to facilitate threading the ductile material.

A further feature of this invention is a bonding tip assembly having a holder for the pressure member which allows rapid insertion and removal of the pressure member. This holder advantageously has a groove matching the groove in the pressure member to further facilitate the threading of the assembly.

In the accompanying drawings:

FIG. 1 is an enlarged side view in section of a bonding tip assembly of the invention;

FIG. 2 is a further enlarged exploded perspective view of the bonding tip assembly of FIG. 1;

FIG. 3 is an enlarged cross-sectional view through the bonding tip; and

FIG. 4 is an enlarged perspective view of another embodiment of the invention.

The present invention is embodied in apparatus for joining ductile materials including a replaceable bonding tip assembly insertable in a positioning and pressure transferring means. The bonding tip assembly is comprised of a pressure member which is tapered to a point, a holder in cooperating engagement with the pressure member to form a passage for supplying a ductile material to the tip and a retainer to urge the pressure member and holder against each other and maintain the configuration of the passage substantially constant.

A bonding tip assembly 21, FIG. 1, in accordance with one embodiment of this invention includes a pressure member 23, a holder for the pressure member 25, and a retaining spring 27. This assembly 21 is maintained in a positioning arm 29 by a cover plate 31. The positioning arm 29 is used to locate the bonding tip assembly 21 over the desired area and to transmit pressure thereto through cover plate 31. Cover plate 31 is attached to positioning arm 29 by a bolt 33 which may be loosened to allow rotation of the cover plate. The rotation of cover plate 31 allows easy access to the bonding assembly 21 for repair or replacement. A funnel shaped hole 35 is provided in cover plate 31 to facilitate the feeding of a fine aluminum wire 37 to pressure member 23.

Wire 37 will advantageously be supplied to the bonding tip assembly 21 from a spool or similar source of sufficient length to make a large number of bonds without rethreading the bonding tip assembly. To maintain the wire 37 in bonding tip assembly 21 when the assembly is being moved from one location to another, a bend 39 which is strong enough to prevent the wire from being pulled from the needle is formed in wire 37. Bend 39 is formed using conventional cutting and forming mechanisms for wire bonders. Bend 39 also facilitates the forming of good bonds and aids the operator in locating the bonding apparatus above the desired bonding area.

Pressure member holder 25 advantageously is machined from tungsten carbide. Tungsten carbide has the advantageous feature of being a hard metallic alloy, yet capable of being readily machined. A large body of knowledge is readily available on the machining of this material because it is widely used for the fabrication of many tools. Holder 25, as shown in FIG. 2, is cylindrical in shape at the top and tapers to a fine point 41. This taper is provided to aid the insertion of bonding tip assembly 21 in positioning arm 29. The taper also aids the operator in the observation of the working area so that the assembly may be placed in the correct location to make the wire bond. A slot 45 is provided in the holder to receive pressure member 23. A face 47 in this slot is fabricated to mate with a face of pressure member 23. In face 47 a tapered groove 49 is machined to aid in the threading of bonding tip assembly 21. Groove 49 is quite large at the top of the holder and tapers to its termination point approximately 1/8″ above point 41. Bonding tip assembly 21 is held in the positioning arm 29 by a shoulder 51 on holder 25 which seats on a shoulder 53 of the positioning arm. This shoulder 51 is relatively small because it is only required to support the weight of bonding tip assembly 21.

Pressure member 23 is constructed of a material similar to that used for the holder 25. The use of similar materials in the fabrication of the assembly is desirable because of the similarity in physical properties. Pressure member 23 has a parallelepiped body that tapers to a chisel shaped tip 54. The faces of the chisel portion are formed at approximately a 30° included angle to form the tip 54 which is approximately 4 mils square. Because of the shape of pressure member 23 and the ability to obtain precise measurements of the contour of tip 54, a high degree of reproducibility of close dimensional tolerances is possible at a low cost. Pressure member 23 is subject to wear because it is the portion of bonding tip assembly 21 which repeatedly applies pressure and heat to the ductile materials being joined. To prevent point 41 from contacting the materials to be bonded, tip 54 extends a few thousandths of an inch beyond point 41. The amount of this extension is dependent upon the thickness of the material being bonded. The elemental design of pressure member 23, shown here, is selected to reduce the cost of manufacturing. Other structures may be used but they must be capable of withstanding pressures of about 70,000 lbs. per square inch at temperatures of above 250° C. If pressure member 23 is damaged it may easily be removed and a new pressure member inserted. The use of separable parts and the capability of machining almost identical pressure members makes replacement feasible at a very low cost. This rapid replacement substantially reduces the production time lost during this type of operation.

Spring 27 is selected as an expeditious means for maintaining pressure member 23 in holder 25. The friction between pressure member 23 and holder 25 is sufficient to prevent the pressure member from falling out of the assembly when raised. A shoulder 57 presses against a flat 59 in holder 25 and rests in slots (not shown) in positioning arm 29 to maintain the assembly in the proper orientation. Spring 27 also permits the rapid changing of pressure member 23 or bonding assembly 21.

FIG. 3 shows a cross sectional view of pressure member 23 and a portion of holder 25. The configuration of the matching grooves 49 and 55 are clearly shown in this figure. Groove 49 tapers from about 1/8 inch above point 41 to a very wide opening at the opposite end of holder 25. Groove 55 has a constant dimension throughout, except the very top where a slight relief is formed. With this smooth configuration it is possible to thread a very fine wire, as small as about 1 mil, through this long opening without the wire jamming or kinking. The use of separable parts for the bonding tip assembly also permits the rapid removal of any jam or broken wire segments that might occur during this threading process or during the operation of the bonder.

In another embodiment of the invention, FIG. 4, an alternate structure for the assembly is shown. An insert holder 61, which may be fabricated from stainless steel, is provided with a large slot 63. A backing plate 65 fabricated from a hard metallic alloy, such as tungsten carbide, is inserted into slot 63 and brazed or otherwise affixed to insert holder 61. The combination of insert holder 61 and backing plate 65 results in a pressure tip holder which functions in the same manner as pressure tip holder 51 described above. A pressure member 67, of a material similar to backing plate 65, is combined with the joined backing plate 65 and insert holder 61 to form the bonding tip assembly 21. The various features which have been described above are incorporated in these parts to obtain the highly functional bonding tip assembly desired.

A bonding tip assembly according to the invention advantageously has a pressure member, for making contact with the ductile materials, formed from a hard, heat conducting material. The well known carbides offer these advantages and are readily machined to very close tolerances. The tip of this member may be adjusted in accordance with the ductile material being used. To provide the required strength, the pressure member will have a body which is substantially larger than the tip. The tip may advantageously be formed by tapering a portion of the body. This tip will be fine enough to permit the formation of effective bonds and observation of the work area by an operator. In forming the pressure member, consideration should be given to the required strength to reduce the possibilities of damage while maintaining the capability of joining very fine wires. The quality of the bond formed is, in a large part, dependent upon the quality of the tip. This tip should be formed to very close tolerances with a good blending of the radii so that there is a proper flow of the ductile material. An elemental shape is advantageous for the pressure member because this allows easy reproduction to a very high degree of accuracy.

To more fully utilize bonding equipment, a holder may be provided which allows the rapid insertion or removal of interchangeable pressure members. This holder will advantageously have a slot or receptacle into which the pressure member may be inserted. The material used for the holder should be similar to that used for the pressure member since intimate contact will be maintained between these two portions of the bonding tip assembly. This holder may be constructed as one piece or a plurality of pieces as determined by the size required and the materials utilized. The point of the holder should have a shape similar to the tip of the pressure member but should terminate in such manner that the tip is sufficiently extended to make effective bonds.

To facilitate the feeding of the wire through the bonding tip assembly a smoothly tapered hole therein is advantageous. With the separable pressure member and holder, mating V or U shaped grooves may be accurately machined in the two parts to a specified taper. The opening of this groove at the end opposite the pressure member tip may be substantially larger than the wire to be bonded. These wires are often very small having diameters of about .0005 to .015 inch. The large opening, smoothly machined surface, and even taper of these grooves permits the easy threading of the wire with very little danger of jamming or damaging the pressure tip.

The pressure member is beneficially held in place in a manner which allows it to be easily removed. A movable plate covering the bonding tip assembly is an advantageous way to transmit pressure to the pressure member from the positioning arm. This plate advantageously is constructed to allow the removal of only the pressure member or of the entire pressure tip assembly. The pressure member is prevented from becoming disengaged from the raised assembly by a retainer, such as a spring, which forces it against the holder. The friction between these two parts maintains the pressure member in the desired position. In this way, the pressure member may be easily removed for replacement or unjamming. Also, the production time lost will be reduced when changing pressure members because a new pressure member, when inserted, will be maintained in the same position as the one removed. With the movable cover plate it is possible to change assemblies to accommodate a new wire size in about the same time as it takes to replace a pressure member.

The above description and drawings show that the present invention provides a novel bonding tip assembly for joining ductile materials. Furthermore, the use of the bonding tip assembly of the invention reduces the cost of forming bonds by reducing the cost of the pressure member. Moreover, the bonding tip assembly provides a pressure member which is structurally stronger and not as easily damaged as conventional pressure members. Also, the bonding tip assembly is fabricated to facilitate the threading of the ductile material therein and to provide easy access for repair and replacement thereof.

It will be apparent from the above description and drawings that various modifications in the details set forth may be made within the scope of the invention. Therefore, the invention is not intended to be limited to the specific assembly except as may be required by the following claims.

I claim:
1. Apparatus for joining ductile materials including a replaceable bonding tip assembly insertable into a positioning and pressure transferring means,
    said bonding tip assembly comprising a pressure member tapered to a tip and having a smooth elongated groove extending along its entire length to said tip,
    a holder in cooperating engagement with said pressure member and facing said groove to form a passage for supplying said ductile material to said tip and having a facing groove tapered such that an upper portion adjacent said positioning means has a diameter greater than the size of a ductile material and tapering to a point intermediate said tip and said positioning means for facilitating feeding said ductile material between said facing grooves,
    said tip of said pressure member extending beyond a corresponding end of said holder so as to contact and apply a pressure to said ductile material in a manner such that the holder does not contact said ductile material, and
    retaining means for urging said pressure member and said holder against each other and for maintaining the configuration of said facing groove substantially constant.

2. Apparatus for joining ductile material including a positioning member having an opening,
    a replaceable bonding tip assembly disposed within said opening and pressure transferring means secured to said positioning member for transmitting pressure therefrom to said bonding tip assembly,
    said bonding tip assembly comprising a pressure member tapered to a tip formed of hard material and having an elongated, smooth, V-shaped groove extending its entire length to said tip,
    a holder facing said pressure member and said groove and having a corresponding tapered groove with a maximum dimension adjacent said opening and tapering to a point intermediate said opening and said tip, both grooves having smooth surfaces and aligned one with the other,
    said tip of said pressure member extending beyond a corresponding end of said holder to contact and apply pressure to said ductile material in a manner such that said holder does not contact said ductile material, and
    retaining means urging said pressure member and said holder against each other such that the grooves are facing each other to form a wire passageway.

3. Apparatus according to claim 1 wherein said retaining means comprises a T-shaped spring with a downwardly extending leg urging said pressure member and holder against each other.

4. Apparatus according to claim 2 wherein said holder is an elongated member having a shoulder at one end cooperating with said opening to maintain said bonding tip assembly in said positioning arm, said holder tapered on the end opposite said shoulder forming a blunt point of similar shape to said tip of said pressure member, said shoulder having a groove originating near said point and increasing to an enlarged section capable of readily receiving said ductile material at said shoulder.

5. Apparatus according to claim 1 wherein said holder is mounted on a separate backing plate and rigidly secured thereto with the backing plate being made of material softer than said holder.

6. Apparatus according to claim 2, wherein said pressure transferring means is a movable member releasably secured to said positioning means and having a funnel-shaped opening aligned with said passage with the funnel opening away from said passage for facilitating the feeding of said ductile materials therethrough with a small opening of the funnel being aligned directly over the grooves in said pressure member.

References Cited

UNITED STATES PATENTS 2,981,825   4/1961   Rundell _____ 219—136

RICHARD H. EANES, JR., *Primary Examiner.*